Patented June 12, 1934

1,962,137

UNITED STATES PATENT OFFICE 1,962,137

PRODUCTION OF ALPHA NAPHTHOL

William J. Cotton, Buffalo, N. Y., assignor to National Aniline & Chemical Company, Inc., New York, N. Y., a corporation of New York No Drawing. Application November 9, 1929, Serial No. 406,151

26 Claims. (Cl. 260—154)

This invention relates to a process for the production of alpha-naphthol (1-naphthol), and more particularly to a process which includes sulfonating naphthalene to form 1-naphthalenemonosulfonic acid, and fusing the monosulfonic acid with caustic alkali.

Alpha-naphthol (1-naphthol), which finds extensive use as an intermediate product in the manufacture of various synthetic products, such as dyes, is frequently employed in processes in which the presence of 2-naphthol is undesirable and sometimes harmful. It has been the general practice heretofore to prepare 1-naphthol substantially free from 2-naphthol by hydrolyzing 1-naphthylamine with dilute sulfuric acid under pressure. This process is expensive, however, owing to the high cost of the 1-naphthylamine and the high cost of equipment and maintenance thereof. Attempts also have been made to prepare from naphthalene a satisfactory 1-naphthol substantially free from 2-naphthol by the sulfonation of naphthalene and the subsequent fusion with alkali of the isolated sulfonation product, but thus far these attempts have been unsuccessful.

An object of the invention is to produce 1-naphthol substantially free from 2-naphthol by a process which includes the sulfonation of naphthalene to form 1-naphthalenemonosulfonic acid and the subsequent fusion of the sulfonic acid with caustic alkali, and which process gives an improved quality of 1-naphthol directly from naphthalene economically and readily on a commercial scale.

Another object of the invention is to sulfonate naphthalene under such conditions that there is produced 1-naphthalenemonosulfonic acid substantially free from 2-naphthalenemonosulfonic acid.

An additional object of the invention is to sulfonate naphthalene under such conditions that there is formed a mixture which contains 1-naphthalenemonosulfonic acid and a naphthalenedisulfonic acid, and which is substantially free from 2-naphthalenemonosulfonic acid.

A further object of the invention is to induce the crystallization of 1-naphthalenemonosulfonic acid from an acid solution without adding a crystal of said acid to the solution as a seed.

Other objects of the invention are to fuse a mixture containing 1-naphthalenemonosulfonic acid, 1.6-naphthalenedisulfonic acid, and/or 1.5-naphthalenedisulfonic acid, which mixture is substantially free from 2-naphthalenemonosulfonic acid, with caustic alkali under such conditions that there are formed the alkali-metal compounds of 1-naphthol and of 1.6-and/or 1.5-naphthol sulfonic acids; and to separate the 1-naphthol from the naphthol sulfonic acids.

Other objects of the invention will in part be obvious and will in part appear hereinafter.

The invention accordingly comprises the several steps and the relation of one or more of such steps with respect to each of the others thereof which will be exemplified in the process hereinafter disclosed, and the scope of the invention will be indicated in the claims.

In the practice of the present invention, the objects thereof are accomplished by sulfonating naphthalene with sulfuric acid under such conditions that there is formed a mixture of 1-naphthalenemonosulfonic acid and a naphthalenedisulfonic acid, which mixture contains less than 2 per cent. of 2-naphthalenemonosulfonic acid and preferably is substantially free from 2-naphthalenemonosulfonic acid. The 1-naphthalenemonosulfonic acid is then converted to 1-naphthol, as by fusing the resulting mixture of sulfonic acids with caustic alkali to form a mixture of the alkali-metal compounds of 1-naphthol and of a naphthol sulfonic acid, and liberating the 1-naphthol from the mixture of alkali-metal compounds while leaving the naphthol sulfonic acid in solution.

The sulfonation may be carried out by adding naphthalene to well-stirred concentrated sulfuric acid while maintaining the temperature at about 15° to 30° C., preferably at 20° to 25° C., and the sulfonation is allowed to continue at said temperature after the addition of the naphthalene is complete. The 1-naphthalenemonosulfonic acid which is formed is caused to crystallize from the reaction mixture when the reaction mixture becomes supersaturated therewith. The naphthalene is preferably in finely divided form, and may be added in portions and at such a rate that cooling to the desired extent may be readily accomplished without danger of local overheating.

Sulfuric acid of a strength ranging from about 93 to 100 per cent. may be employed, the stronger acid being preferred inasmuch as its use leads to a less amount of unsulfonated naphthalene in the product. The acid is preferably employed in the proportion of about three parts by weight of acid per part by weight of naphthalene, but other amounts of acid may be used. If too little acid is used, however, stirring of the mass becomes extremely difficult and undersulfonation may result.

For the preparation of a 1-naphthol substantially free from 2-naphthol, it is essential that the sulfonation be conducted in such a manner that very little, if any, 2-naphthalenemonosulfonic acid is obtained. I have found that if the 1-naphthalenemonosulfonic acid is caused to crystallize substantially as soon as the reaction mixture becomes supersaturated with respect to it, or as soon thereafter as is possible, and crystallization is caused gradually to continue throughout the sulfonation, less than 2 per cent., and usually substantially no 2-naphthalenemonosulfonic acid is obtained, but 1.5- and 1.6-naphthalenedisulfonic acids are obtained. If, however, the reaction mixture does not crystallize, a considerable amount of 2-naphthalenemonosulfonic acid is produced, or if the reaction mixture is permitted to become excessively supersaturated with respect to 1-napthalenemonosulfonic acid, sudden spontaneous crystallization of the whole reaction mixture may result, accompanied by excessive liberation of heat together with setting of the mixture to a solid mass which no longer can be stirred, and also leading to the production of a considerable amount of 2-naphthalenemonosulfonic acid.

Under the conditions of the present process, the reaction mixture will have become supersaturated with respect to the 1-naphthalenemonosulfonic acid within a short period of the time when all of the naphthalene has been added. It sometimes happens that the mass seeds itself and the 1-naphthalenemonosulfonic acid gradually precipitates as it is produced. In order to insure the desired crystallization, the reaction mixture is seeded substantially as soon as it becomes saturated with respect to the 1-naphthalenemonosulfonic acid, and if this does not cause crystallization, seeding is repeated at short intervals until the 1-naphthalenemonosulfonic acid begins to crystallize out of solution. In seeding the reaction mixture, there may be used either a crystal, or crystals, of 1-naphthalenemonosulfonic acid or of a soluble salt of said sulfonic acid. I have found that 1-naphthalenemonosulfonic acid can be crystallized from a supersaturated solution of the same by the addition to the supersaturated solution of a crystal of a soluble salt of said acid. To complete the sulfonation, the reaction mixture is maintained at the reaction temperature (15° to 30° C., preferably 20° to 25° C.) for a period of from about 2 or 3 to about 40 hours after completion of the addition of the naphthalene. For the production of maximum yields of 1-naphthalenemonosulfonic acid and minimum production of 2-naphthalenesulfonic acid, however, a total reaction time of about 20 to 25 hours from the beginning of the addition of the naphthalene is preferred.

As a result of the sulfonation there is obtained a mixture which contains more than about 80 per cent. of 1-naphthalenemonosulfonic acid, less than about 20 per cent. of naphthalenedisulfonic acids, and less than about 2 per cent., generally less than about 0.5 per cent. of 2-naphthalenemonosulfonic acid, together with excess sulfuric acid and, in some cases, some unreacted naphthalene.

After the completion of the sulfonation, the naphthalene sulfonic acids are separated from the remaining reaction mixture. This separation may be effected in any suitable manner; e. g., by diluting the mass, salting out with sodium or potassium chloride or other suitable salt, and filtering off the sodium or potassium salts of the naphthalene sulfonic acids; or by diluting the mass, converting the sulfonic acids and excess sulfuric acid to their calcium salts by the addition of a suitable calcium compound (e. g., calcium carbonate, calcium sulfite, calcium oxide or hydroxide, etc.), filtering off the insoluble calcium sulfate, converting the calcium naphthalene sulfonates to alkali-metal sulfonates by the addition of a suitable alkalimetal compound (e. g. sodium carbonate, potassium carbonate, sodium sulfite, etc.), filtering off the insoluble calcium salt formed, and crystallizing the alkali-metal salts of the naphthalene sulfonic acids from the resulting filtrate; or by extracting the sulfonic acids with a suitable solvent; etc. The mixture of naphthalene sulfonic acids or their alkali-metal salts may be dried, or they may be employed in the subsequent fusion process in the form of a moist press cake.

In carrying out the fusion in accordance with a preferred method of procedure, the mixture of 1-naphthalene-monosulfonic acid with 1.5- and 1.6-naphthalenedisulfonic acids obtained as the product of the sulfonation process above described is fused under pressure in an autoclave with an excess of caustic alkali under such conditions that the 1-naphthalenemonosulfonic acid is converted to an alkali-metal 1-naphtholate while the naphthalenedisulfonic acids are mainly converted to the alkali-metal salts of naphtholmonosulfonic acids. The caustic alkali (e. g., sodium hydroxide, potassium hydroxide, or a mixture thereof) is preferably employed in such proportions relative to the mixture of naphthalene sulfonic acids that there is present in the melt at least sufficient excess caustic alkali to form a flux and render the melt capable of being agitated at the reaction temperature while avoiding so great an excess of caustic alkali as to convert the naphthalenedisulfonic acids to excessive amounts of dihydroxy compounds. The fusion may be carried out at a temperature of about 275° C. to 310° C., preferably at a temperature not exceeding 285° C., and preferably for a minimum reaction period of about 5½ to 6 hours at the reaction temperature. Upon completion of the fusion, the 1-naphthol may be isolated from the fusion mixture, e. g. by extracting the fusion mass from the autoclave and converting the alkali-metal 1-naphtholate to 1-naphthol, while leaving the naphthol sulfonic acids and any unconverted disulfonic acids in solution in the form of their alkali-metal salts, and separating the 1-naphthol from the remaining solution; e. g. by filtration, decantation, centrifuging, etc.

The 1-naphthol thus obtained may be employed without further purification for the production of dyestuffs, but if desired it may be further purified by distillation, and the distillation may be recovered in the form of flakes or chips.

As an illustrative embodiment of a manner in which the invention may be practiced, the following example is presented:

*Example*

*Sulfonation of naphthalene.*—500 pounds of ground naphthalene (20 mesh or finer) is charged in portions and with good agitation to a sulfonating kettle which contains about 1440 pounds of sulfuric acid (100%). The rate of charging of the naphthalene is such that it requires approximately 5 hours for the addition of the whole charge. The temperature of the sulfonation kettle is kept throughout the charging operation at a temperature of about 20° to 25° C. In order to prevent, so far as possible, the formation of 2-naphthalenemonosulfonic acid, the 1-naphthalenemonosulfonic acid is caused to crystallize as early in the sulfonation as possible; for, the earlier the crystallization of the 1-naphthalenemonosulfonic acid occurs, the smaller is the quantity of 2-naphthalenemonosulfonic acid produced. If crystallization should not have commenced before all of the naphthalene has been added, when the addition of naphthalene is complete, the reaction mixture is seeded at intervals with small portions of crystals of 1-naphthalenemonosulfonic acid until crystallization has been induced. After all of the naphthalene has been added, the reaction is allowed to continue for an additional period of about 17 hours while still maintaining the temperature at about 20° to 25° C.

The resulting sulfonation mass contains only traces of unsulfonated naphthalene, if any, or from a trace to less than 1.5 per cent. of 2-naphthalenemonosulfonic acid, depending upon how early in the sulfonation crystallization of the 1-naphthalenemonosulfonic acid occurred. After completion of the sulfonation (total time about 22 hours from the start of charging the naphthalene), the batch is diluted by adding it to about 10,000 pounds of water, and calcium carbonate (e. g., ground limestone) is added until the mixture reacts neutral to Congo red paper. The mass is then filtered to remove the calcium sulfate formed. The filtrate is treated with an excess of soda ash ($Na_2CO_3$), and the resulting calcium carbonate is filtered off. The filtrate is evaporated until the point of incipient crystallization is reached, and is then cooled to precipitate the sodium salts of the 1-naphthalenesulfonic acid and naphthalenedisulfonic acids. The mass is filtered and the press cake, which contains the sodium salts of the sulfonic acids, is dried in an atmospheric drier at a temperature of about 110° C.

The liquor obtained from the final filtration operation may be employed as a part of the dilution water in a repetition of the process, and the calcium carbonate which is filtered off from the solution after the treatment with soda ash may be reused in a subsequent repetition of the process. The product obtained by the above process comprises a mixture of 1-naphthalenemonosulfonic acid and naphthalenedisulfonic acids in the form of their sodium salts, and is substantially free from 2-naphthalenemonosulfonic acid and its sodium salt.

*Alkali fusion of the sulfonic acid mixture.*—600 pounds of the dry product obtained in the above described manner and comprising the sodium salts of 1-naphthalenesulfonic acid and naphthalenedisulfonic acids is mixed with about 490 pounds of solid sodium hydroxide (98%), and the mixture is added to an autoclave equipped with an agitator. The autoclave is closed, and the mixture is gradually heated to a reaction temperature of about 230° to 285° C. and is maintained at said reaction temperature until the reaction is complete (about 6 hours). Agitation is begun as soon as the mass becomes sufficiently pasty to be stirred. Upon completion of the fusion, the autoclave is cooled to reduce the pressure, hot water is pumped in under pressure, and, after further cooling, the autoclave is opened and additional water is added to complete the solution of the melt. The solution is then filtered to remove solid impurities, the filtrate is heated to a temperature above the melting point of 1-naphthol, (e. g., to about 75° C.) and dilute sulfuric acid (50° Bé.) is added until the alkalinity of the solution toward phenolphthalein paper just disappears (about 690 pounds being required). The 1-naphthol is thereby precipitated in the form of oily globules while the naphthol sulfonic acids are left in solution in the form of their soluble sodium salts. The mass is cooled to a temperature below the setting point of 1-naphthol (e. g., to about 35° C.) to solidify and complete the precipitation of the 1-naphthol, which is then separated by filtration. The filter cake is washed with water until a test with Brilliant Yellow paper shows no alkaline reaction, and it is then blown for a short time with air.

The 1-naphthol obtained as a result of the above process is substantially free from 2-naphthol, from naphthol sulfonic acids, and from naphthalenedisulfonic acids; and it is of sufficient purity for employment in the manufacture of dyestuffs, e. g., Orange I (C. I. No. 150), without further treatment. If desired, it may be further purified by vacuum distillation, and the distillate may be flaked.

It will be realized that the invention is not limited to the process and the details thereof which are set forth in the foregoing example. Thus, the sulfonation may be carried out with a sulfuric acid of a strength lower than 100 per cent., e. g., 93 per cent. sulfuric acid, but when such weak sulfuric acid is employed a part of the naphthalene is not sulfonated, and it is more difficult to induce crystallization. The amount of sulfuric acid employed may be varied, but an amount is preferably employed such that the sulfonation mass can be readily stirred throughout the sulfonation. The rate at which the naphthalene is incorporated with the sulfuric acid may be varied, but for optimum results it is desirable that the addition should not take place so rapidly that local overheating occurs or that the temperature of the mass exceeds about 30° C.

It may not always be necessary to seed the sulfonation mass in order to induce a gradual crystallization of the 1-naphthalenemonosulfonic acid; but unless crystallization of the 1-naphthalenemonosulfonic acid is caused to occur at an early stage in the sulfonation, and preferably as soon as the reaction mixture has become supersaturated with respect to 1-naphthalenemonosulfonic acid, 2-naphthalenemonosulfonic acid will be produced. Furthermore, crystallization may otherwise suddenly occur at a later stage in the sulfonation, causing the mixture to set to a solid mass which can no longer be agitated, and liberating a considerable amount of heat, thereby undesirably raising the temperature of the sulfonation mass. In seeding the sulfonation mass, crystals of 1-naphthalenemonosulfonic acid or of its soluble salts, e. g., an alkali-metal salt, may be used. For ease of operation, crystals of the free acid are employed, which may be a portion of the final sulfonation mixture saved for that purpose from a previous operation of the process.

A total reaction time of about 20 to 24 hours is preferred for maximum yields of 1-naphthalenemonosulfonic acid, but if desired, and if the accompanying loss in yield of 1-naphthalenemonosulfonic acid is not of consequence, the sulfonation may be terminated about 2 or 3 hours after all of the naphthalene has been added to the reaction mixture. In removing the excess sulfuric acid at the completion of the sulfonation, other suitable calcium compounds may be employed instead of, or together with, the calcium carbonate;

e. g., calcium oxide, calcium hydroxide, calcium sulfite, etc. The sulfonic acids also may be separated from the sulfonation mass in any other suitable manner, e. g., by salting out with common salt (NaCl), by extraction with a solvent, etc. The press cake containing the sodium salts of the naphthalene sulfonic acids need not be dried for use in the subsequent alkali fusion process, and is advantageously used in the moist condition; inasmuch as the presence of the moisture enables the fusion to be carried out at the lower temperatures, and leads to a purer product and a somewhat higher yield.

In carrying out the fusion of the sulfonic acids, temperatures of about 275° to 310° C. may be employed, the lower temperatures being preferred to the higher temperatures. For optimum results, the fusion is conducted at the lowest temperature at which the mass may be well stirred. The period of heating at the reaction temperature may also be varied, but a period of about 5½ to 6 hours at a reaction temperature of about 280° to 285° C. leads to a maximum yield of 1-naphthol. At a lower temperature a somewhat longer time is required.

Sodium or potassium hydroxide or a mixture thereof may be employed in the fusion; and the proportion thereof employed relative to the naphthalene sulfonic acid mixture may be varied. The use of too little caustic, however, will lead to difficulty in agitating the melt, and too much caustic may cause formation of excessive amounts of dihydroxy-naphthalene compounds. The fusion is preferably conducted with the exclusion of air; for, the presence of air in caustic alkali fusions of the type of the present process leads to some decomposition and contamination of the product.

Isolation of 1-naphthol and separation of it from the naphthol sulfonic acids present with it in the melt in the form of their sodium salts may be effected by the addition of sulfuric acid of any suitable strength, and instead of sulfuric acid, other acids, e. g., hydrochloric acid, may be used. The use of too strong sulfuric acid (e. g., 100%) should be avoided, however, since local sulfonation of the product and consequent loss of yield may result during acidification under the temperature conditions employed. The amount of acid used may be varied, but an amount is preferably used such that the hydrogen ion concentration of the resulting solution expressed in terms of pH lies within the range of about 8 to about 9, inclusive. Under such conditions of acid concentration, substantially all of the sodium naphtholate is converted to naphthol while the sodium sulfite and the sodium salts of the naphthol sulfonic acids, and of any unconverted disulfonic acids present, are substantially unaffected and are left in solution. This condition is indicated by the solution's ceasing to react alkaline toward phenolphthalein paper while it still reacts strongly alkaline toward Brilliant Yellow paper. A greater acidity (i. e. lower pH value) than about that given above will lead to the formation of bisulfite and loss in yield of naphthol, due to formation of a soluble naphthol sulfite ester.

The temperature of precipitation of the 1-naphthol may be other than that specifically mentioned, but by effecting the precipitation at an elevated temperature, the 1-naphthol is caused to separate as oily globules, which on subsequent cooling congeal, with a minimum of occlusion, to readily filterable pellets. In cooling the precipitated 1-naphthol, care should be taken to avoid excessive cooling if sulfuric acid has been employed to liberate the naphthol from the sodium naphtholate, otherwise Glauber's salt may separate and contaminate the product.

The invention thus affords a means of producing 1-naphthol substantially free from 2-naphthol by a process which includes the sulfonation of naphthalene to form 1-naphthalenemonosulfonic acid and the subsequent fusion of the sulfonic acid with caustic alkali. It permits, in the sulfonation of naphthalene with sulfuric acid, of the production of 1-naphthalenemonosulfonic acid substantially free from 2-naphthalenemonosulfonic acid, and of the production of a mixture which contains 1-naphthalenemonosulphonic acid, a naphthalene disulfonic acid and less than 2 per cent. and even substantially no 2-naphthalenemonosulfonic acid. It enables the crystallization of 1-naphthalenemonosulfonic acid from an acid solution to be brought about without the addition to the solution of a crystal of said sulfonic acid as a seed, and makes possible the fusion with caustic alkali of a mixture which contains 1-naphthalenemonosulfonic acid, 1.6-naphthalenedisulfonic acid, and/or 1.5-naphthalenedisulfonic and which is substantially free from 2-naphthalenemonosulfonic acid, for the production of a mixture containing the alkali-metal compounds of 1-naphthol and of 1.6- and/or 1.5-naphtholsulfonic acid, and the separation of 1-naphthol from said mixture.

Since certain changes may be made in carrying out the above process without departing from the scope of the invention, it is intended that all matter contained in the above description shall be interpreted as illustrative and not in a limiting sense, except as limited by the claims.

The preparation of 1-naphthol by fusing with caustic alkali a mixture which contains 1-naphthalenemonosulfonic acid and a naphthalene disulfonic acid, and which may or may not contain 2-naphthalenemonosulfonic acid, to produce a mixture containing the alkali-metal compounds of 1-naphthol and of a naphthol sulfonic acid, and the separation and recovery of 1-naphthol from a mixture of alkali-metal compounds of 1-naphthol and of a naphthol sulfonic acid by selectively acidifying the mixture are claimed generically in my copending application Serial No. 406,152, filed on even date herewith, for "Process of producing alpha-naphthol". They are claimed specifically as a part of the present invention for the production of 1-naphthol substantially free from 2-naphthol in combination with the perparation of 1-naphthalenemonosulfonic acid substantially free from 2-naphthalenemonosulfonic acid.

I claim:

1. A process for the production of 1-naphthol which comprises sulfonating naphthalene under such conditions that there is produced a mixture containing 1-naphthalenemonosulfonic acid and a naphthalenedisulfonic acid, which mixture is substantially free from 2-naphthalenemonosulfonic acid, and fusing said mixture of sulfonic acids with a caustic alkali.

2. A process for the production of 1-naphthol which comprises sulfonating naphthalene under such conditions that there is produced a mixture containing 1-naphthalenemonosulfonic acid and a naphthalenedisulfonic acid, which mixture is substantially free from 2-naphthalenemonosulfonic acid, fusing said mixture of sulfonic acids with a caustic alkali to produce a mixture of the alkali-metal compounds of 1-naphthol and of a naphthol sulfonic acid, and isolating 1-naphthol from said mixture.

3. A process for the production of 1-naphthol which comprises sulfonating naphthalene under such conditions that there is produced a mixture containing 1-naphthalenemonosulfonic acid and a naphthalenedisulfonic acid, which mixture is substantially free from 2-naphthalenemonosulfonic acid, fusing said mixture of sulfonic acids with a caustic alkali to produce a mixture containing the alkali-metal compounds of 1-naphthol and a naphthol sulfonic acid, converting said mixture of alkali-metal compounds to a mixture of 1-naphthol and the alkali-metal salt of the naphthol sulfonic acid, and separating the 1-naphthol.

4. A process for the production of 1-naphthol which comprises sulfonating naphthalene under such conditions that there is produced a mixture containing 1-naphthalenemonosulfonic acid and a naphthalenedisulfonic acid, which mixture is substantially free from 2-naphthalenemonosulfonic acid, fusing such mixture of sulfonic acids with a caustic alkali to produce a mixture of the alkali-metal compounds of 1-naphthol and of a naphthol sulfonic acid, and acidifying the mass to liberate 1-naphthol.

5. A process for the production of 1-naphthol which comprises sulfonating naphthalene under such conditions that there is produced a mixture containing 1-naphthalenemonosulfonic acid, and a naphthalenedisulfonic acid, which mixture is substantially free from 2-naphthalenemonosulfonic acid, fusing said mixture of sulfonic acids with a caustic alkali to produce a mixture containing the alkali-metal compounds of 1-naphthol and of a naphthol sulfonic acid, acidifying said mixture of alkali-metal compounds to produce 1-naphthol and an alkali-metal salt of a naphthol sulfonic acid, and separating the 1-naphthol.

6. A process for the production of 1-naphthol which comprises sulfonating naphthalene under such conditions that there is produced a mixture containing 1-naphthalenemonosulfonic acid and a naphthalenedisulfonic acid, which mixture is substantially free from 2-naphthalenemonosulfonic acid, fusing said mixture of sulfonic acids with a caustic alkali to produce a mixture of the alkali-metal compounds of 1-naphthol and of a naphthol sulfonic acid, which mixture is substantially free from an alkali-metal dihydroxy-naphthalene compound, acidifying said mixture to convert said alkali-metal compounds to a mixture of 1-naphthol and of a naphthol sulfonic acid which is substantially wholly in the form of its alkali-metal salt, and separating the 1-naphthol.

7. A process for the production of 1-naphthol which comprises adding naphthalene to concentrated sulfuric acid, maintaining the temperature of the sulfonation mixture between 15° and 30° C., causing 1-naphthalenemonosulfonic acid to crystallize when the reaction mixture has become saturated therewith, continuing the sulfonation for at least 3 hours after all of the naphthalene has been added, while maintaining the temperature at about 15° to 30° C., fusing the resulting mixture of sulfonic acids with a caustic alkali to produce a mixture of the alkali-metal compounds of 1-naphthol and of a naphthol sulfonic acid, which mixture is substantially free from an alkali-metal compound of 2-naphthol and of a dihydroxy-naphthalene, treating said mixture with such an amount of an acid that the naphthol sulfonic acid compound is converted substantially completely to its mono-alkali-metal salt, and separating the 1-naphthol thereby produced.

8. A process for the production of 1-naphthol which comprises adding about 1 part by weight of naphthalene to about 3 parts by weight of sulfuric acid of about 100 per cent. concentration while maintaining the temperature between 15° and 30° C., seeding the sulfonation mixture to induce crystallization of 1-naphthalenemonosulfonic acid, continuing the sulfonation at a temperature of about 15° to 30° C., the total reaction period being about 20 to 24 hours, fusing the mixture of sulfonic acids thereby produced with a caustic alkali to produce a mixture of alkali-metal compounds of 1-naphthol and of naphthol sulfonic acids, which mixture is substantially free from an alkali-metal compound of 2-naphthol and of a dihydroxy-naphthalene, acidifying said mixture to produce a solution of which the pH lies within the range of about 8 to 9, inclusive, and separating the 1-naphthol.

9. A process for the production of 1-naphthol which comprises adding about 1 part by weight of naphthalene to about 3 parts by weight of sulfuric acid of about 100 per cent. concentration while maintaining the temperature between 20° and 25° C., adding crystalline 1-naphthalenemonosulfonic acid as a seed to induce crystallization when all of the naphthalene has been added, continuing the sulfonation at a temperature of about 20° to 25° C., the total reaction period being about 20 to 24 hours, fusing the mixture of sulfonic acids thereby produced with a caustic alkali at a temperature of about 280° to 285° C., to produce a mixture of alkali-metal compounds of 1-naphthol and of naphthol sulfonic acids, acidifying the mixture of alkali-metal compounds thereby produced to form a solution of which the pH lies within the range of about 8 to 9, inclusive, while maintaining the mixture at a temperature above the melting point of 1-naphthol, cooling the mixture to solidify the 1-naphthol and separating said 1-naphthol.

10. A process for the production of 1-naphthol which comprises adding about one part by weight of naphthalene to about three parts by weight of sulfuric acid of about 100 percent concentration while maintaining the temperature between 20° and 25° C., adding crystalline 1-naphthalenemonosulfonic acid sodium salt as a seed to induce crystallization when all of the naphthalene has been added, continuing the sulfonation at a temperature of about 20° to 25° C., the total reaction period being about 22 hours, fusing the mixture of sulfonic acids thereby produced with sodium hydroxide at a temperature of about 280° to 285° C., to produce a mixture of sodium compounds of 1-naphthol and of naphthol sulfonic acids, acidifying the mixture of sodium compounds thereby produced with sulfuric acid to form a solution of which the pH lies within the range of about 8 to 9, inclusive, while maintaining the mixture at a temperature of about 75° C., cooling the mixture to a temperature of about 35° C. to solidify the 1-naphthol, and separating said 1-naphthol.

11. A process which comprises preparing 1-naphthalenemonosulfonic acid by the sulfonation of naphthalene with sulfuric acid, while maintaining the temperature of the sulfonation mass at about 20° to 25° C., and crystallizing the sulfonation mixture as soon as possible.

12. A process which comprises preparing 1-naphthalenemonosulfonic acid by the sulfonation of naphthalene with sulfuric acid, while maintaining the temperature of the sulfonation mass between 20° and 25° C., and substantially as soon as the sulfonation mixture becomes saturated with 1-naphthalenemonosulfonic acid seeding it to cause crystallization thereof.

13. A process which comprises preparing 1-naphthalenemonosulfonic acid by the sulfonation of naphthalene with sulfuric acid, while maintaining the temperature of the sulfonation mass between 20° and 25° C., and substantially as soon as the sulfonation mixture becomes saturated with 1-naphthalenemonosulfonic acid seeding it with 1-naphthalenemonosulfonic acid sodium salt to cause crystallization of the 1-naphthalenemonosulfonic acid.

14. A process which comprises preparing 1-naphthalenemonosulfonic acid by reacting naphthalene with about 3 parts by weight of sulfuric acid, crystallizing 1-naphthalenemonosulfonic acid when the reaction mixture becomes supersaturated therewith, and then continuing the sulfonation with continued crystallization of 1-naphthalenemonosulfonic acid.

15. A process which comprises preparing 1-naphthalenemonosulfonic acid by reacting naphthalene with concentrated sulfuric acid at a temperature of about 15° to 30° C., inducing 1-naphthalenemonosulfonic acid to crystallize when the reaction mixture has become supersaturated therewith, the sulfuric acid being in an amount sufficient to enable the reaction mixture readily to be stirred, and then continuing the sulfonation with continued crystallization of 1-naphthalenemonosulfonic acid.

16. A process which comprises preparing 1-naphthalenemonosulfonic acid by reacting naphthalene at a temperature of about 15° to 30° C. with sulfuric acid of about 100 per cent. concentration in the proportion of about 3 parts by weight of sulfuric acid per part by weight of naphthalene, causing the 1-naphthalenemonosulfonic acid to crystallize when the reaction mixture becomes supersaturated therewith, and continuing the sulfonation after all of the naphthalene has been added.

17. A process which comprises preparing 1-naphthalenemonosulfonic acid by adding naphthalene to concentrated sulfuric acid, maintaining the temperature of the sulfonation mixture between 15° and 30° C., inducing 1-naphthalenemonosulfonic acid to crystallize as soon as possible, and continuing the sulfonation after all of the naphthalene has been added.

18. A process which comprises preparing 1-naphthalenemonosulfonic acid by adding naphthalene to concentrated sulfuric acid, crystallizing the sulfonation mixture substantially as soon as the naphthalene has all been added, and continuing the sulfonation for at least 3 hours after all of the naphthalene has been added.

19. A process which comprisees preparing 1-naphthalenemonosulfonic acid by adding naphthalene to sulfuric acid of about 100 per cent. concentration, seeding the reaction mixture when all of the naphthalene has been added, to induce crystallization of 1-naphthalenemonosulfonic acid, and continuing the sulfonation, the total reaction period being about 20 to 24 hours.

20. A process which comprises preparing 1-naphthalenemonosulfonic acid by the sulfonation of naphthalene with sulfuric acid, for about 20 to 24 hours while maintaining the temperature of the sulfonation mass at about 20° to 25° C., and seeding the sulfonation mixture substantially as soon as it becomes saturated with 1-naphthalenemonosulfonic acid, in order to induce crystallization thereof.

21. A process which comprises preparing 1-naphthalenemonosulfonic acid by adding naphthalene to concentrated sulfuric acid, maintaining the temperature of the sulfonation mixture between 15° and 30° C., inducing the 1-naphthalenemonosulfonic acid to crystallize when the reaction mixture becomes supersaturated therewith, and continuing the sulfonation for at least 3 hours after all of the naphthalene has been added, while maintaining the temperature at about 15° to 30° C.

22. A process which comprises preparing 1-naphthalenemonosulfonic acid by adding naphthalene to concentrated sulfuric acid at a temperature of about 15° to 30° C., seeding the sulfonation mixture to induce crystallization of 1-naphthalenemonosulfonic acid when it becomes saturated therewith, and continuing the sulfonation for at least 3 hours after the 1-naphthalenemonosulfonic acid has begun to crystallize while maintaining the temperature at about 15° to 30° C.

23. A process which comprises preparing 1-naphthalenemonosulfonic acid by adding about 1 part by weight of naphthalene to about 3 parts by weight of sulfuric acid of about 100 per cent. concentration while maintaining the temperature between 15° and 30° C., seeding the sulfonation mixture to induce crystallization of 1-naphthalenemonosulfonic acid, and continuing the sulfonation at a temperature of about 15° to 30° C., the total reaction period being about 20 to 24 hours.

24. A process which comprises preparing 1-naphthalenemonosulfonic acid by adding about 1 part by weight of naphthalene to about 3 parts by weight of sulfuric acid of about 100 per cent. concentration while maintaining the temperature at about 20° to 25° C., adding crystalline 1-naphthalenemonosulfonic acid sodium salt as a seed to induce crystallization when all of the naphthalene has been added, and continuing the sulfonation at a temperature of about 20° to 25° C., the total reaction period being about 20 to 24 hours.

25. A process which comprises crystallizing 1-naphthalenemonosulfonic acid from a saturated acid solution thereof by seeding said solution with a crystal of a soluble salt of said acid.

26. A process which comprises crystallizing 1-naphthalenemonosulfonic acid from a saturated acid solution thereof by seeding said solution with a crystal of sodium 1-naphthalenesulfonate.

WILLIAM J. COTTON.